United States Patent [19]

Mori

[11] Patent Number: 4,890,275
[45] Date of Patent: Dec. 26, 1989

[54] READING CIRCUIT IN AN OPTICAL DISK APPARATUS

[75] Inventor: Kunitaka Mori, Tokyo, Japan

[73] Assignee: NEC Corporation, Japan

[21] Appl. No.: 183,626

[22] Filed: Apr. 8, 1988

Related U.S. Application Data

[63] Continuation of Ser. No. 836,399, Mar. 5, 1986.

[30] Foreign Application Priority Data

Mar. 5, 1985 [JP] Japan .................................. 60-43489

[51] Int. Cl.$^4$ .............................................. G11B 7/00
[52] U.S. Cl. ...................................................... 369/59
[58] Field of Search ................. 369/59, 109, 110, 111; 360/41, 67

[56] References Cited

U.S. PATENT DOCUMENTS 4,475,183  10/1984  Marchant et al. ..................... 369/59

Primary Examiner—Vincent P. Canney
Attorney, Agent, or Firm—Ostrolenk, Faber, Gerb & Soffen

[57] ABSTRACT

A reading circuit with improved accuracy for an optical disk apparatus, which includes two separate systems for processing the read-out signal from the photo-transducer. In the first system, the read-out signal is differentiated and then a zero-level detector generates a binary signal to indicate whether the differentiated signal is positive or negative, whereby the binary signal indicates whether the edges of the read-out signal are rising or falling. The second system is a pit detecting circuit which generates a pit detecting signal by comparing the read-out signal with a fixed reference voltage, the pit detecting signal thus indicating the spacing between pits in the read-out signal. An AND gate combines the pit detecting signal with the inverse of the binary signal, generating pulses in close synchronism with the rising edges of the pits on the optical disk, and these pulses are shaped so as to correspond very closely to the recorded information. In another form of the invention, the pit detecting circuit includes a second differentiator for differentiating the first differentiated signal to generate a second differentiated signal, the latter being compared with a fixed reference voltage, providing further improvements in accuracy.

6 Claims, 3 Drawing Sheets

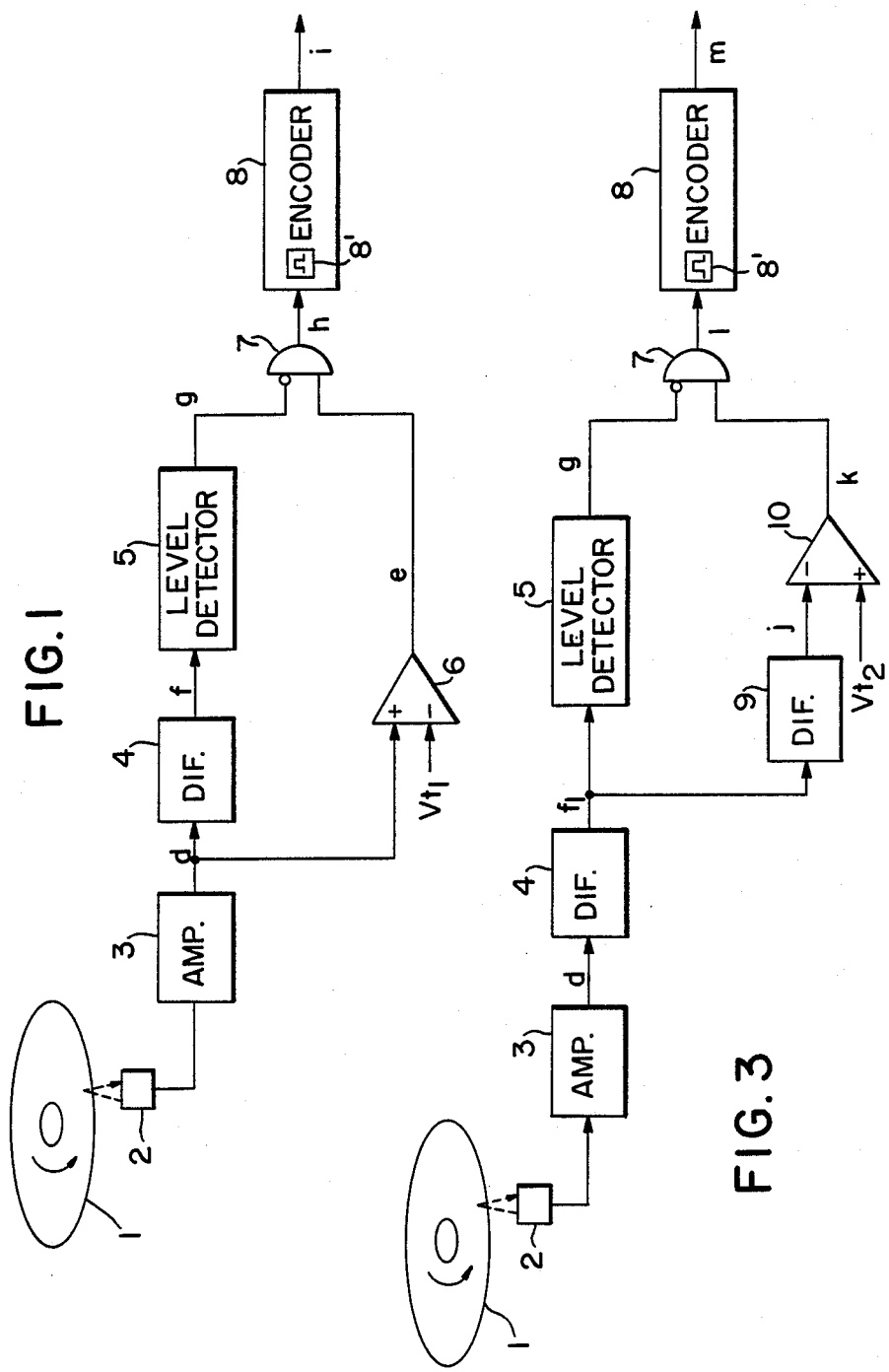

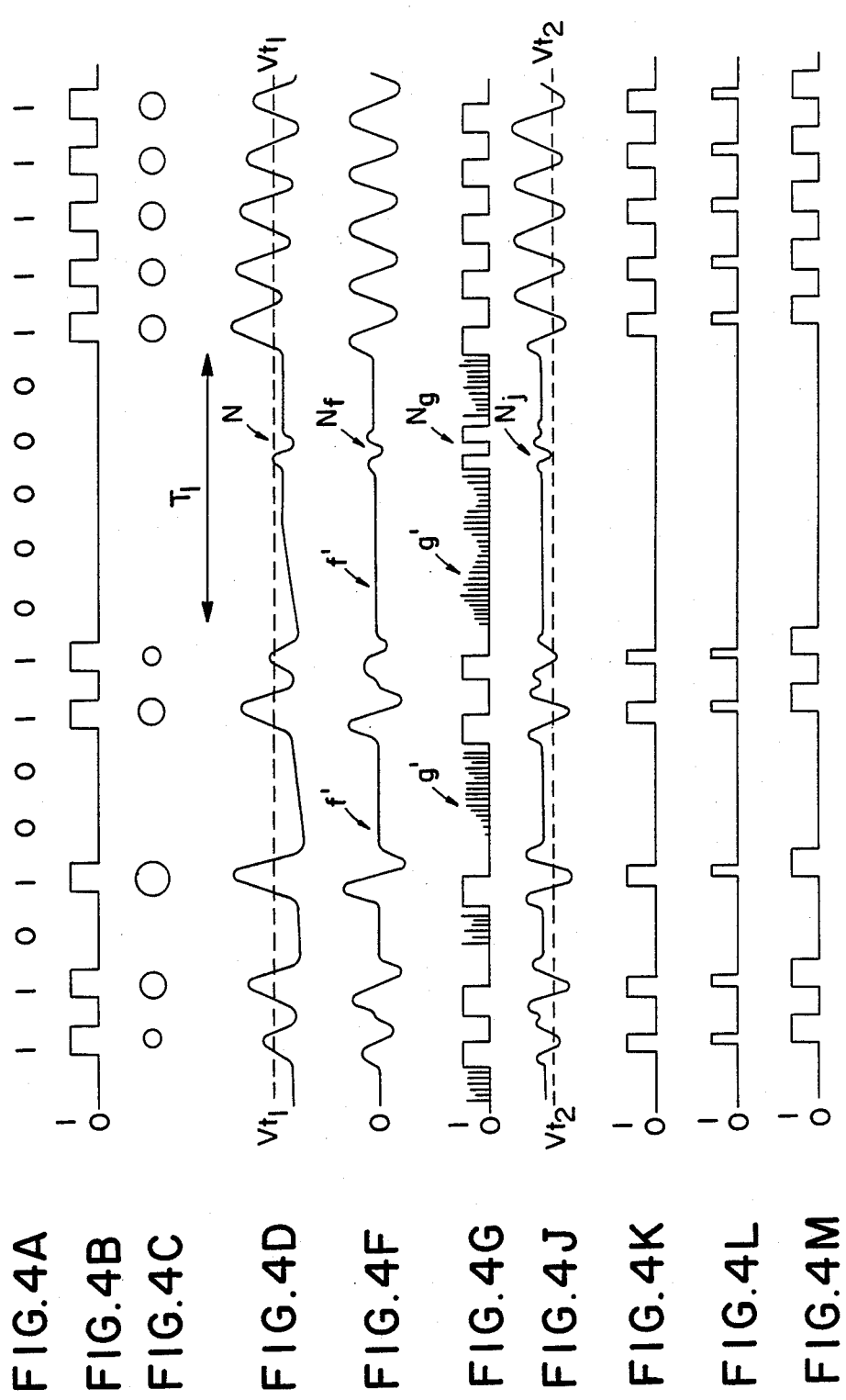

READING CIRCUIT IN AN OPTICAL DISK APPARATUS

This is a continuation of application Ser. No. 836,399, filed Mar. 5, 1986, allowed.

BACKGROUND OF THE INVENTION

The present invention relates to a reading circuit in an optical disk apparatus (hereinafter referred to as "optical disk drive") to transform an analog signal obtained by optically read-out information from an optical disk into digital data.

An optical disk drive employs an optical disk whose surface is provided with a photo-sensitive recording medium on which information is recorded in the form of a pattern of pits. The optical disk drive irradiates the optical disk with a tiny spot of laser light so as to read the recorded information out of the optical disk by means of a reflected beam therefrom. The intensity of the reflected beam is changed in accordance with the presence or absence of a pit on the surface of the optical disk. The reflected beam is transformed into an analog electrical signal by a photo-transducer. The analog electrical signal (hereinafter referred to as the read-out signal) has a waveform which is in proportion to the intensity of the reflected beam. Then, the read-out signal is converted into a rectangular signal by a reading circuit, the rectangular signal representing digital information.

As is well known in the art, the read-out signal includes an AC component representing the recorded information on the surface of the optical disk and an DC component superimposed on the AC component. Therefore, the DC component should be removed from the read-out signal by the reading circuit when the read-out signal is converted into the rectangular signal.

Such a reading circuit is disclosed in U.S. Pat. No. 4,499,570, issued on Feb. 12, 1985. In accordance with this prior art, a read-out signal is supplied to a threshold-value circuit and compared with a reference signal in order to be converted into a rectangular output signal. The reference signal is generated by means of a detector which measures the average DC level of the rectangular output signal. That is, the detector varies the reference signal level in response to the average DC level of the previous rectangular output signal and the present read-out signal is compared with the variable reference level corresponding to the DC component level in the previous read-out signal. As a result, the rectangular output signal thus obtained substantially represents the AC component of the read-out signal in digital form.

In above-described reading circuit, the value of the DC component to be removed is generated in response to the previously read-out signal, and therefore, the DC component that is removed from the presently read-out signal does not have the same value as that of the DC component included in the presently read-out signal. In other words, the detector cannot set the reference signal that is supplied to the threshold-value circuit at a level corresponding to the present DC component of the presently read-out signal. Accordingly, in the case that the DC component of the read out signal is abruptly changed by a large amount, the reference signal level is far different from the actual DC component level of the read-out signal, with the result that the read-out signal is compared with an improper threshold value in order to be converted into a rectangular signal. Thus, mis-reading has often occurred.

SUMMARY OF THE INVENTION

Therefore, an object of the present invention is to provide a reading circuit in an optical disk drive capable of converting an AC component of a read-out signal, which represents recorded information on the surface of an optical disk and is superimposed on a DC component, into a rectangular signal with high accuracy.

Another object of the present invention is to provide a reading circuit in an optical disk drive capable of converting an analog read-out signal into a digital signal without measuring a DC component of the read-out signal.

According to the present invention, a reading circuit comprises differentiator means for differentiating the read-out signal to generate a differentiated signal and zero-level detector means for generating a rectangular signal by detecting whether the differentiated signal is positive or negative. The reading circuit also comprises a pit detecting circuit generating a pit detecting signal by comparing the read-out signal with a fixed reference voltage, the pit detecting signal indicating the period of the presence of pits in the read-out signal, combining means to generate an AND signal by multiplying or combining the inverse of the rectangular signal and the pit detecting signal, and an encoded means for generating a rectangular encode signal representative of the recorded information in response to the AND signal. The pit detecting circuit may also differentiate the first differentiated signal to generate a second differentiated signal, and then compare the latter with a fixed reference voltage.

BRIEF DESCRIPTION OF THE DRAWINGS

The above-mentioned and other objects, features and advantages of the present invention will be better understood from the following detailed description of preferred embodiments of the present invention taken in conjunction with the accompanying drawings, wherein:

FIG. 1 is a schematic block diagram of a first embodiment of an optical disk drive according to the present invention;

FIGS. 2A to 2I are waveform charts for explaining the converting operation of the optical disk drive shown in FIG. 1;

FIG. 3 is a schematic block diagram of a second embodiment of an optical disk drive according to the present invention; and FIGS. 4A–4D, 4F, 4G and 4J to 4M are waveform charts for explaining the converting operation of the optical disk drive shown in FIG. 3.

DESCRIPTION OF THE PREFERRED EMBODIMENTS

Referring to FIG. 1, an optical disk drive employs an optical disk 1 on which information is recorded in the form of a pattern of pits. A photo-transducer 2 irradiates the optical disk 1 with a tiny spot of laser light, optically reads the recorded information by means of a reflected beam from the disk 1, and then transforms it into an electric signal. An amplifier 3 amplifies the electric signal to output an analog read-out signal d. A differentiator 4 differentiates the read-out signal d and supplies a differentiated signal f to a zero-level detector 5. The detector 5 converts the differentiated signal f into a binary signal g by detecting the polarity of the signal f.

The binary signal g takes high level when the signal f takes positive value. The detector 5 supplies the signal g to one terminal of an AND gate 7.

On the other hand, a comparator 6 compares the read-out signal d with a predetermined threshold value $V_{t1}$ to generate another binary signal e which is supplied to another terminal of the AND gate 7. The AND gate 7 combines the binary signal e and the inverted signal of the binary signal g to output an AND signal h. An encoder 8 makes a rectangular signal i in response to the signal h.

Figures 2A, 2B, 2C, 2D, 2E, 2F, 2G, 2H, 2I:
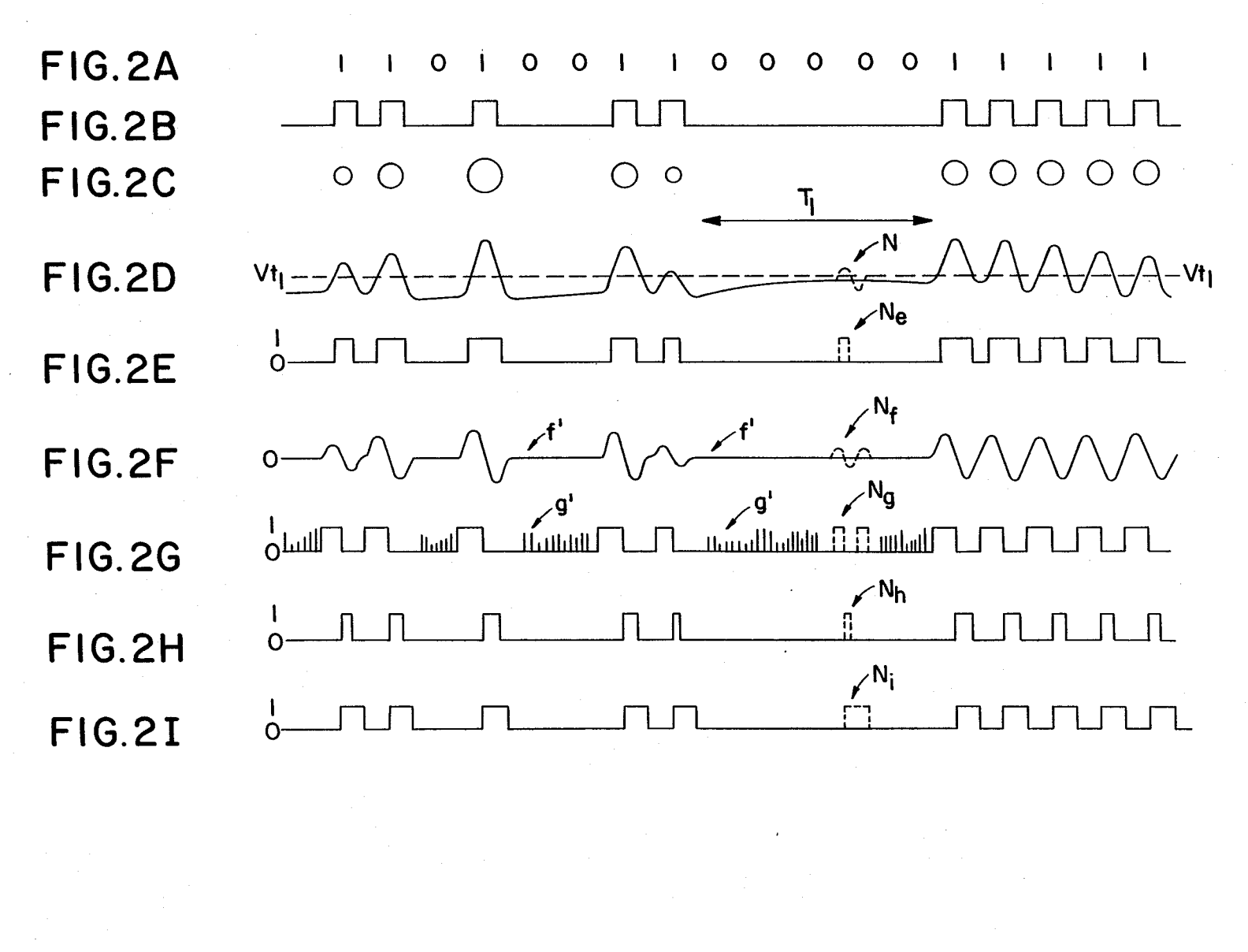

The converting process will be described in more detail referring further to FIGS. 2A to 2I.

The information a (FIG. 2A) has been recorded as a recording signal b (FIG. 2B) on the surface of the optical disk 1 in accordance with, for instance, the NRZ modulation. A recording laser beam is output during the high level periods of the signal b, and thus a pattern of pits c (FIG. 2C) is formed on the surface of the disk 1. Although the sizes of the pits are different from each other on the surface of the disk 1 because of deviations of the tiny spot of the laser beam, variations in the photo-sensitive medium of the disk, and so on, the encoding operation is carried out independent of the pit size but dependent rather on the interval between the adjacent pits. The encoding operation is carried out to reproduce the recording signal b from the pattern of the pits c with high accuracy.

The reflected laser beam from the surface of the disk is converted into the read-out signal d (FIG. 2D) in the manner described above. The read-out signal d includes an AC component representing the recorded information, i.e., the pattern of the pits c, and a DC component is superimposed on the AC component, as known in the art. Thus, the average value of the read-out signal d is varied as shown in FIG. 2D. Accordingly, in the binary signal e (FIG. 2E) obtained by comparing the readouts with the constant threshold value $V_{t1}$ which is set at 0 V in this embodiment, the pulse intervals do not correctly correspond to those of the recording signal b. Thus, the binary signal e is used for indicating the period of the presence of the pits, but is not used for detecting the intervals between the pits in this embodiment.

The peak of the read-out signal d corresponds to the center of the pit since the pit has a circular configuration. Accordingly, the pit intervals are determined by detecting the peak timing of the read-out signal d and then encoding it. To this end, the read-out signal d is differentiated to obtain the signal f (FIG. 2F). The peak timing of the read-out signal d can be determined by detecting the times when the falling curve portion of the differentiated signal f crosses the 0 level. The zero-level detector 5 outputs the binary signal g (FIG. 2G) which takes has a high level when the signal f is higher than 0 V, and a low level when the signal f is lower than 0 V. Thus, the falling edge of the signal g indicate the peak timing of the read-out signal d.

However, the signal g is unstable when the differentiated signal f has the 0 level, as shown in FIG. 2F at the points indicated by reference f', so that unnecessary pulses g' (FIG. 2G) may occur during the period f'. Therefore, it is necessary to distinguish the falling edges of the binary signal g caused by the peaks of the read-out signal d from the unnecessary pulses g'. To this end, the binary signal e obtained by the comparator 6 is utilized. The falling edges of the binary signal g corresponding to the peaks of the read-out signal d can be selected by combining (ANDing) the binary signal e and the inverse of the binary signal g to generate the AND signal h (FIG. 2H) by means of the AND gate 7.

The AND signal h triggers a monostable multivibrator 8' included in the encoder 8 at its rising edge. The pulse width of the monostable multivibrator 8' is set at the same width as that of the recording signal b. Thus, the rectangular signal (encode signal) i (FIG. 2I) can be obtained as the reproducing signal of the recording signal b.

In the first embodiment, the peak timing of the read-out signal d is detected by the differentiator 4 and the comparator 6. The encoder 8 is triggered by the peak timing to output the rectangular signal i having the predetermined pulse width. Accordingly, the pulses of the rectangular signal i are synchronized with those of the recording signal b. Thus, the rectangular signal i represents the recorded information a without being affected by the DC component of the read-out signal d.

However, in FIG. 2, noise N can easily be superimposed on the read-out signal d in a portion thereof where the pit interval is relatively long, i.e., where the read-out signal d includes substantially only a DC signal having a value nearly equal to the threshold value $V_{t1}$, for instance, during period $T_1$ in FIG. 2D. When the amplitude of the noise N is larger than the threshold value $V_{T1}$, the noise N is superimposed on the binary signal e as shown by a pulse $N_e$ in FIG. 2E. The noise N also affects the differentiated signal f and the binary signal g as indicated by a wave $N_f$ and a pulse $N_g$ in FIGS. 2F and 2G, respectively. Then, a pulse $N_h$ is generated by multiplying the pulses $N_e$ and $N_g$ to cause a error pulse $N_i$ in the rectangular signal i. The error pulse $N_i$ may often arise especially in an optical disk drive used in a information processing system, such as a computer, since the digital information processed by the system often includes a binary signal which has continuous "0" level data in relatively long period.

A second embodiment of the present invention provides a reading circuit in which the above-described problem is solved.

FIGS. 3 and 4 illustrate the second embodiment of the present invention in which the same elements and signals in these Figures bear the same reference numerals as in FIGS. 1 and 2. The read-out signal d obtained from the optical disk 1 is differentiated by the differentiator 4, converted into the binary signal g by the zero-level detector 5, and supplied to the AND gate 7, similarly to the first embodiment. However, the optical disk drive according to this embodiment further has another differentiator 9 and a comparator 10 as the means for indicating the period of the presence of the pits instead of the comparator 6 of the first embodiment.

The differentiator 9 further differentiates the output signal f of the differentiator 4 to generate a twice differentiated signal j (FIG. 4J). The comparator 10 compares the signal j with a threshold value $V_{t2}$ to generate a binary signal k. The binary signal k (FIG. 4K) is supplied to the AND gate 7. Also similarly to the first embodiment, an AND signal l (FIG. 4L) triggers the monostable multivibrator 8' to generate a rectangular signal (FIG. 4M) having the same pulse width as the recording signal b.

Referring further to FIG. 4, it is necessary to distinguish the following edges of the binary signal g caused by the peaks of the read-out signal d from the unnecessary pulse g', as described above. To this end, the differentiated signal f is further differentiated by the differentiator 9. The twice differentiated signal j has an enhanced AC component and a reduced DC component. The signal j is compared with the threshold value $V_{t2}$ and converted into the binary signal k which has a low level when the signal j is higher than the threshold value $V_{t2}$, a high level when the signal j is lower than the threshold value $V_{t2}$. The high level period of the signal k indicates the presence of the pit c. It is noted that the threshold value $V_{t2}$ is set at 10 to 30% of the ideal negative peak value of the signal j which is below the 0 V level of the alternating signal j. Accordingly, the downwards peaks of the noise $N_j$ superimposed on the signal j by the noise N do not exceed the threshold value $V_{t2}$, and thus, the noise N does not affect the signal k.

Similarly to the first embodiment, the inverted signal of the signal g and the signal k are combined (ANDed) to generate the AND signal l which triggers the encoder 8. The rectangular signal m is thus generated, which has the same pulse width as the recording signal b. The error pulse does not occur in the rectangular signal m.

In the second embodiment, the DC component of the read-out signal d is further reduced by the differentiator 9 to generate the signal k indicating the period of the presence of the pits. Accordingly, the signal k does not suffer from the effect of the noise N, and thus the rectangular signal m represents the recording signal b with high accuracy.

As described above, a reading circuit of the present invention detects the peak timing of the read-out signal, and then, triggers the encoder to generate the rectangular encoded signal. As a result, accurate and stable encoding can be realized.

Although illustrative embodiments of the invention have been described herein, it is to be understood that the same are for purposes of example and not of limitation, the scope of the invention being limited only by the claims.

What is claimed is:

1. A reading circuit for an optical disk drive comprising:
   a photo-transducer for optically reading recorded information on an optical disk in the form of a pattern of pits by detecting the presence of such pits, said photo-transducer transforming the optically read information into an electrical read-out signal whose peak of one polarity corresponds to substantially a center of said pit;
   first differentiation means for differentiating said read-out signal to generate a first differentiated signal;
   zero-level detector means for generating a first rectangular signal in response to whether said first differentiated signal is positive or negative;
   pit detecting means for generating a pit detecting signal in response to said read-out signal, which indicates the period of the presence of pits in said read-out signal;
   means coupled to said zero-level detector means and said pit detecting means for generating a combination signal only when a level of said first rectangular signal is changed at the same time said pit detecting signal is generated; and
   encoder means for generating a rectangular encoded signal having first and second levels representative of said recorded information, said encoder means changing the level of said rectangular encoded signal from said first level into said second level in response to said combination signal, maintaining said second level during a predetermined constant time period and returning the level of said rectangular encoded signal into said first level after said predetermined constant time period has elapsed.

2. A reading circuit for an optical disk drive as claimed in claim 1, wherein said pit detecting means includes comparator means for generating said pit detecting signal by comparing said read-out signal with a threshold value.

3. A reading circuit for an optical disk drive as claimed in claim 1, wherein said pit detecting means includes second differentiation means for differentiating said first differentiated signal to generate a second differentiated signal, and comparator means for generating said pit detecting signal by comparing said second differentiated signal with a threshold value.

4. A reading method for encoding an electrical read-out signal in an optical disk drive in which a photo-transducer optically reads recorded information on an optical disk in the form of a pattern of pits by detecting the presence of such pits, comprising the steps of:
   transforming the optically read information into an electrical read-out signal whose peak of one polarity corresponds to substantially a center of said pit;
   differentiating said read-out signal to generate a first differentiated signal;
   detecting whether said first differentiated signal is positive or negative to generate a first rectangular signal;
   generating a pit detecting signal in response to said read-out signal, which indicates the period of the presence of pits in said read-out signal;
   generating a combination signal only when a level of said first rectangular signal is changed at the same time said pit detecting signal is generated; and
   generating a rectangular encoded signal having first and second levels representative of said recorded information, said rectangular encoded signal taking said second level in response to said combination signal during a predetermined constant time period and taking said first level after said predetermined constant time period has elapsed.

5. A reading method as claimed in claim 4, wherein said pit detecting signal is generated by the step of comparing said read-out signal with a threshold value.

6. A reading method as claimed in claim 4, wherein said pit detecting signal is generated by the steps of differentiating said first differentiated signal to generate a second differentiated signal, and comparing said second differentiated signal with a threshold value.

* * * * *